United States Patent [19]

Leyland

[11]  4,312,819

[45]  Jan. 26, 1982

[54] AIR COOLING APPARATUS

[76] Inventor: Billy M. Leyland, 7537 N. 16th La., Phoenix, Ariz. 85021

[21] Appl. No.: 207,955

[22] Filed: Nov. 18, 1980

[51] Int. Cl.³ .............................................. B01F 3/04
[52] U.S. Cl. .................................... 261/152; 62/310; 62/314; 62/315; 62/DIG. 16; 98/30; 165/60; 261/29; 261/36 R; 261/108; 261/151; 261/DIG. 3
[58] Field of Search .................. 261/161; 62/310, 314, 62/315, DIG. 16; 98/2.11, 2.14, 30; 165/60; 261/36 R, 151, 29, 152, 108, 158–161, DIG. 3, DIG. 4, DIG. 41, DIG. 77

[56] References Cited

U.S. PATENT DOCUMENTS

| 1,985,910 | 1/1935 | Anderson | 165/60 |
|---|---|---|---|
| 2,725,729 | 12/1955 | Mills | 62/314 X |
| 2,998,714 | 9/1961 | Bonzer | 62/310 X |
| 3,116,612 | 1/1964 | Pennington | 62/310 X |
| 3,153,332 | 10/1964 | Goettl et al. | 62/310 X |
| 3,802,493 | 4/1974 | Goettl | 165/60 |
| 4,234,526 | 11/1980 | Mackay et al. | 261/DIG. 4 |

Primary Examiner—Richard L. Chiesa
Attorney, Agent, or Firm—Herbert E. Haynes, Jr.

[57] ABSTRACT

An apparatus for efficiently and economically cooling air by sequentially passing the air to be cooled through a chilled water heat exchanger mechanism and then through an evaporative cooler mechanism.

13 Claims, 4 Drawing Figures

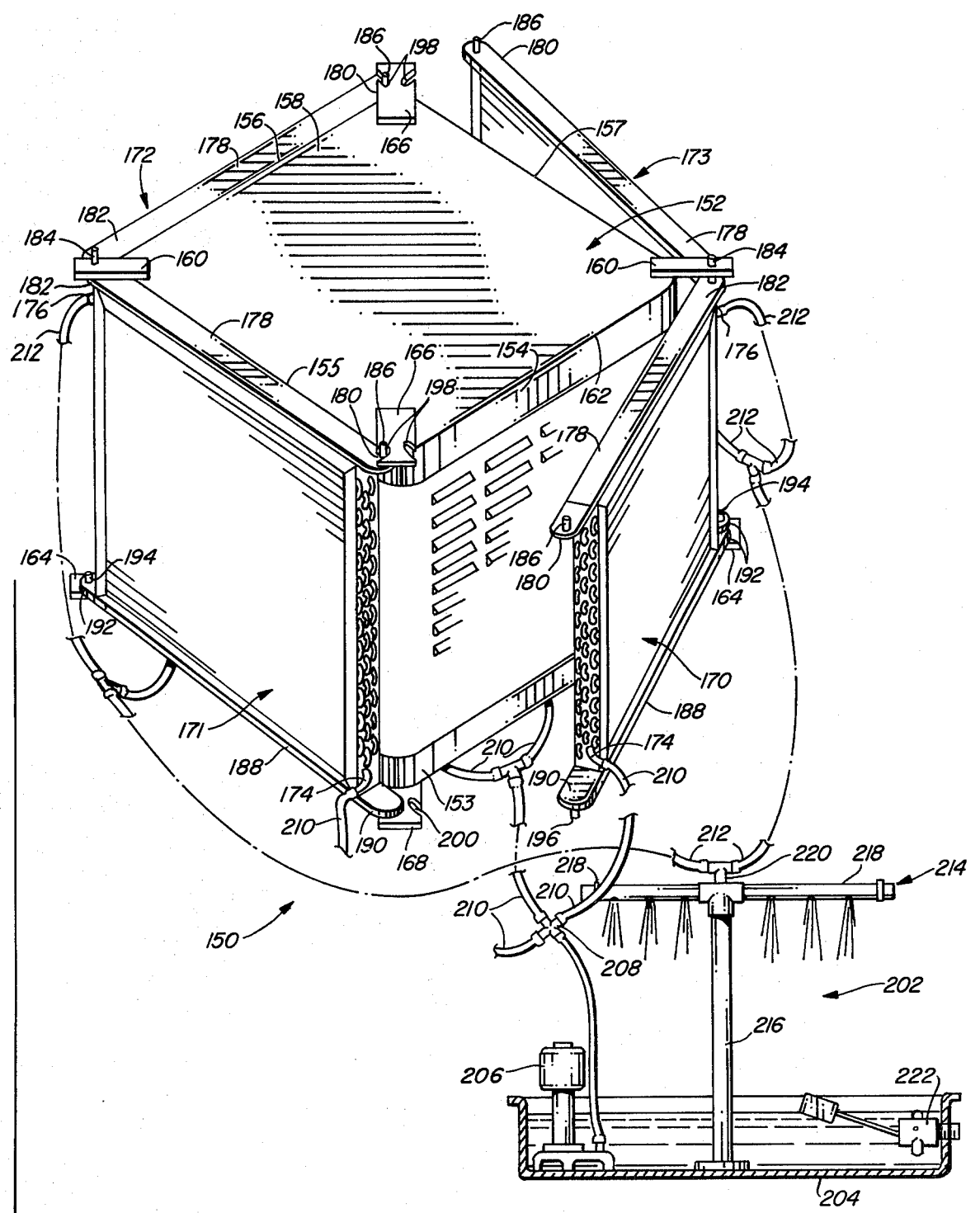

AIR COOLING APPARATUS

BACKGROUND OF THE INVENTION

1. Field of the Invention

This invention relates in general to air conditioning devices and more particularly to an air cooling apparatus which operates on the principles of evaporative cooling and heat exchange.

2. Description of the Prior Art

Devices for cooling air by the evaporation principle have been used for many years with the most successful use of such devices occuring in relatively dry climates for both commercial and residential applications.

The most common evaporative cooler in use today includes a cabinet in which an air moving device, usually in the form of a motor driven centrifugal blower, is mounted for drawing relatively hot and dry ambient air into the cabinet through wettable pads mounted in the sides thereof. As the incoming ambient air moves through the wet pads, it is cooled by evaporation and the air moving device delivers the cooled air to an outlet that is normally mounted in the bottom of the cabinet. A sump located in the bottom of the cooler cabinet is provided with a float controlled shutoff valve which maintains a predetermined water level in the sump, and a motor driven pump is employed to supply water under pressure from the sump into a distribution plumbing network mounted in the top of the cabinet. The water is delivered to the tops of the pads by the plumbing network and flows under the influence of gravity through the pads with the unevaporated water returning to the sump for recirculation.

Although evaporative coolers of the above described type have long been recognized as low cost and relatively efficient mechanisms, their effective use is inherently limited to times when the humidity is low in that their air cooling capability diminishes as the humidity in the atmosphere increases.

Due to the lessening of air cooling effectiveness in times of relatively high humidity, many existing evaporative coolers were replaced with refrigeration units when such units were developed in suitable packages and became available at reasonable initial investment costs, and new construction went almost exclusively to the use of refrigeration units. This trend away from evaporative coolers to refrigeration units in comparatively dry regions started about 20 to 25 years ago and was very well accepted by the consuming public as long as energy was plentiful and relatively inexpensive.

Now, however, with energy in relatively short supply and becoming more expensive every day, many are looking once again to the evaporative cooler as a source of energy conservation and economic relief. The trend today is not a complete reversal of the movement away from evaporative coolers, but is toward a compatable union of evaporative coolers and refrigeration units.

To establish a compatable union, many consumers are placing both an evaporative cooler and a refrigeration unit in communication with a common air delivery ducting network and are using the evaporative cooler when climatic conditions allow the effective use thereof and operate the more costly and energy consuming refrigeration unit only when the evaporative cooler becomes ineffective. This has proven to be successful as far as the reduction of energy and the lowering of operating costs are concerned. However, the search continues for further improvements.

To the best of my knowledge, nothing has been devised or suggested to supplement the operation of evaporative coolers to enable them to satisfactorily cool air in spite of climatic conditions with the objective being to completely replace the more expensive refrigeration units or at least substantially reduce the use time in the above described combination air conditioning system.

SUMMARY OF THE INVENTION

In accordance with the present invention, a new and improved air cooling apparatus is disclosed for cooling air in accordance with two principles, namely, the evaporation principle and the heat exchange principle to overcome, or at least substantially reduce, the inherent limitations of cooling air solely by the evaporation principle.

The apparatus of the present invention is configured similar to that of an evaporative cooler in that it includes a cabinet having an air moving device mounted therein for drawing ambient air into the cabinet through wettable pads mounted in the sides thereof. As the air moves through the wet pads, it is cooled by evaporation and the air moving device delivers that air to a point of use through an air outlet opening formed in the cabinet. In addition to this, the apparatus is further provided with a chilled water heat exchange means for lowering the temperature of the incoming ambient air prior to its being evaporatively cooled in the above described manner. By subjecting the air being cooled to these two separate and distinctly different cooling techniques, significantly lower temperatures of the treated air are achieved and the effects of less than ideal climatic conditions, i.e. high relative himidity, are minimized.

To accomplish the above objectives, the cabinet mentioned above is provided with means for mounting a heat exchanger unit adjacent each of the wettable cooler pads immediately upstream thereof so that the air being drawn into the cabinet passes through the heat exchanger units first and then through the wettable cooler pads. Chilled water is recirculatingly pumped from a water chilling means through the heat exchanger units and returned to the water chilling means.

The water chilling means, for obvious economic reasons, preferably operates in the manner of a cooling tower in which water is allowed to fall through the air so that the water is rapidly and efficiently chilled by evaporation.

In a preferred embodiment, the apparatus of the present invention is configured as a unitary structure which contains all of the mechanisms and devices necessary for subjecting the air to be cooled to the two separate cooling techniques.

In a second embodiment, the heat exchanger units are suitably mounted on an evaporative cooler of conventional configuration with the water chilling means being a separate unit which is coupledd thereto.

Accordingly, it is an object of the present invention to provide a new and improved air cooling apparatus.

Another object of the present invention is to provide a new and improved air cooling apparatus having improved air cooling capabilities as compared to evaporative coolers and being less expensive to operate as compared to refrigeration units.

Another object of the present invention is to provide a new and improved air cooling apparatus which utilizes two separate and distinctly different cooling techniques for inexpensively and efficiently cooling air.

Another object of the present invention is to provide a new and improved air cooling apparatus of the above described character wherein the air to be cooled is reduced in temperature in accordance with the heat exchange principle prior to its being further cooled in accordance with the evaporation principle to minimize the adverse effects that high humidity has on the evaporative cooling of air.

Another object of the present invention is to provide a new and improved air cooling apparatus of the above described type wherein the cooling of the air by the heat exchange principle is accomplished by a chilled-water heat exchange mechanism.

Still another object of the present invention is to provide a new and improved air cooling apparatus of the above described character wherein the chilling of water for use in the heat exchanger mechanism is accomplished by evaporation to minimize the costs of such chilling.

The foregoing and other objects of the present invention as well as the invention itself, may be more fully understood from the following description when read in conjunction with the accompanying drawings.

BRIEF DESCRIPTION OF THE DRAWINGS

FIG. 4 is a perspective view partially in diagrammatic form and illustrating a second embodiment of the air cooling apparatus of the present invention.

DESCRIPTION OF THE PREFERRED EMBODIMENTS

Figure 1:
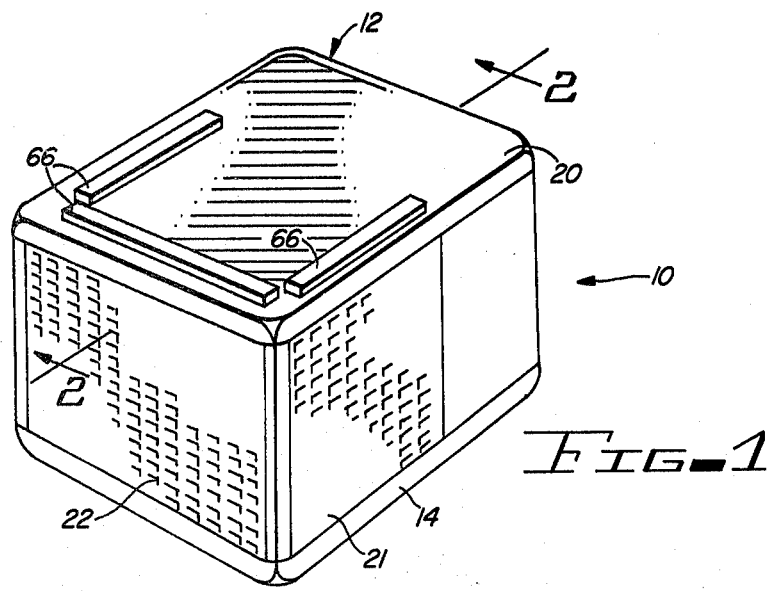
FIG. 1 is a perspective view of the preferred embodiment of the air cooling apparatus of the present invention.
Figure 2:
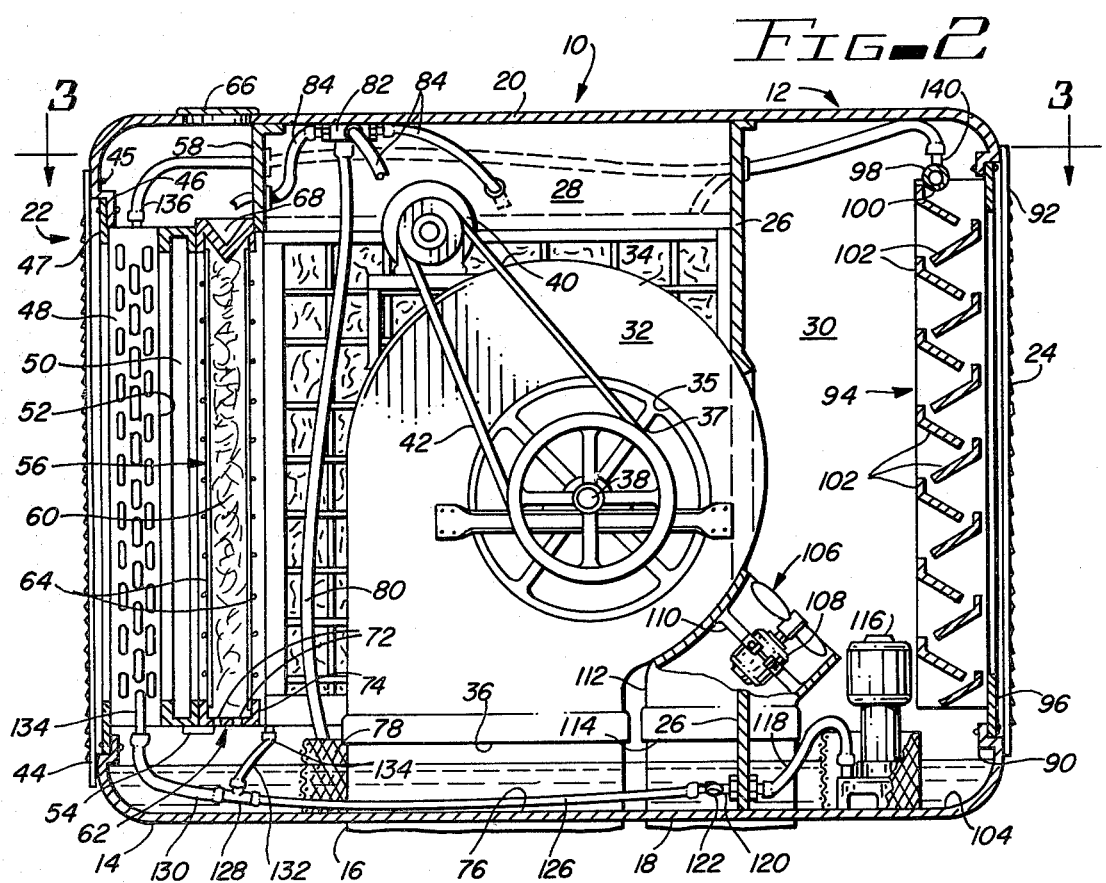
FIG. 2 is an enlarged sectional view taken along the line 2—2 of FIG. 1.
Figure 3:
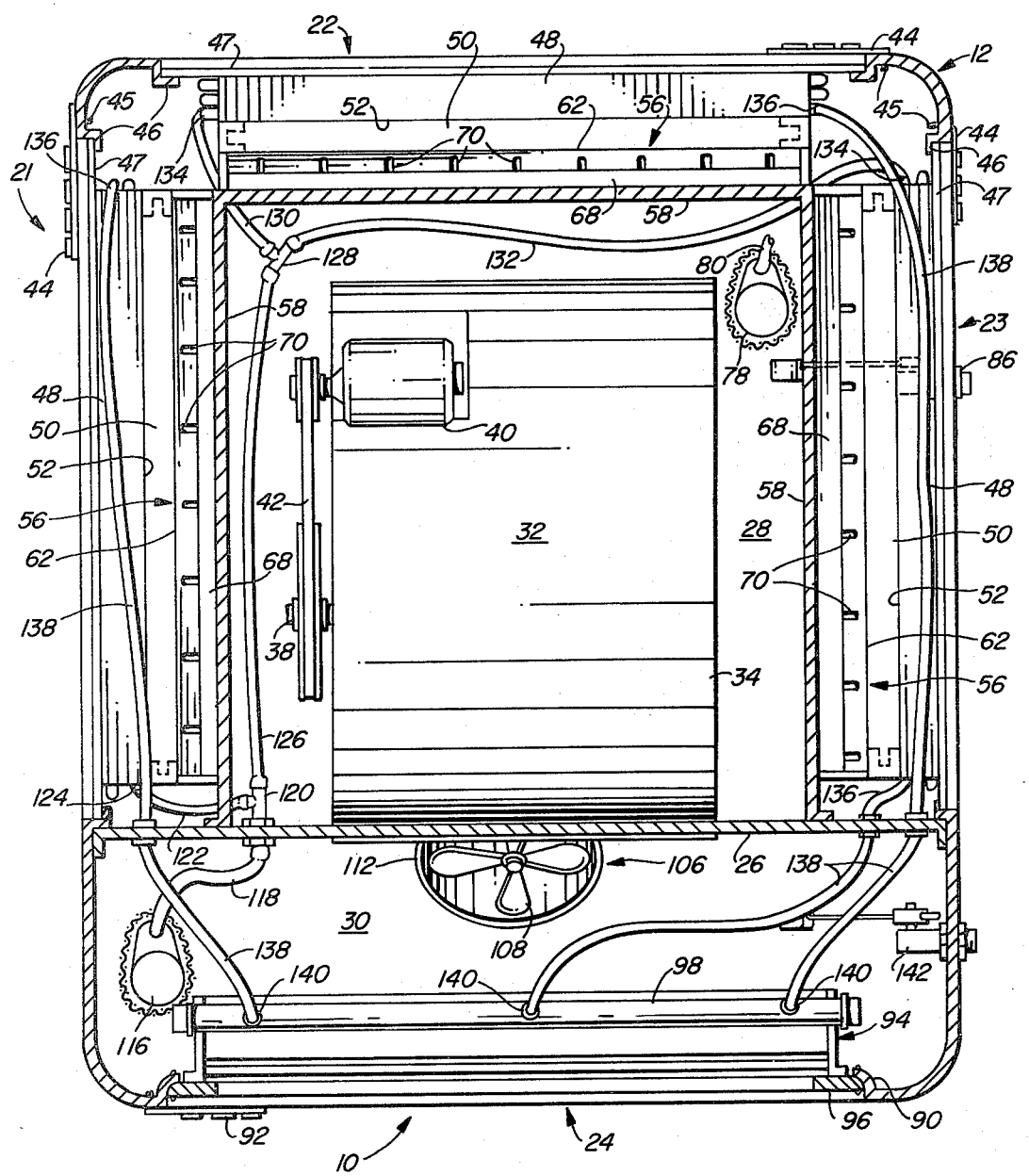
FIG. 3 is a sectional view taken along the line 3—3 of FIG. 2.

Referring more particularly to the drawings, FIGS. 1, 2 and 3 illustrate the preferred form of the air cooling apparatus of the present invention which is indicated generally by the reference numeral 10.

The air cooling apparatus 10 includes a cabinet 12 which is formed in accordance with basic techniques well known in the evaporative cooler arts, with the cabinet being modified so that it is suitable for accomplishing the stated objectives of the invention. Accordingly, and as will hereinafter be described in detail, the cabinet 12 includes a floor pan 14 having a main air outlet duct 16 and an auxiliary air outlet duct 18 formed therein, a roof 20, and as seen best in FIG. 3, is provided with three main air inlet openings 21, 22 and 23 and has an auxiliary air inlet opening 24, all of which are formed in different sidewalls of the cabinet. The cabinet 12 is provided with a divider partition 26 therein which separates the cabinet into an air treatment compartment 28 and a water chilling compartment 30.

The air treatment compartment 28 has a suitable air handling device 32 mounted therein which in the illustrated embodiment is in the form of a centrifugal blower. The air handling device 32 is of the well known type extensively used in the evaporative cooler art and therefore its structural details and operation will only be briefly described herein. The air handler device 32 includes a scroll-shaped housing 34 having an axial air inlet 35 (one shown) in each of its opposite sidewalls and a centrifugal outlet 36 which is suitably connected to the main outlet duct 16. A blower wheel 37 having an axle shaft 38 is coaxially located between the air inlets 35 and is rotatably journaled for rotation therein. An electric motor 40 is mounted on the housing 34 with its output shaft being coupled to the axle shaft 38 of the blower wheel 37 by a belt and pulley mechanism 42 so that the motor 40 rotatably drives the blower wheel 37. In operation, rotation of the blower wheel 37 will move air out of the centrifugal outlet 36 and in doing so will create a negative static pressure which is felt in the centrifugal housing 34 and the air treatment compartment 28 of the cabinet. The negative static pressure results in ambient air being drawn through the main air inlets 21, 22 and 23 into the air treatment compartment 28 of the cabinet 12 and from there through the axial inlets 35 into the housing 34 and from there it is delivered through the centrifugal outlet 36 and the duct 16 to a point of use.

Each of the main air inlet openings 21, 22 and 23 of the cabinet 12 have identical mechanisms mounted adjacent thereto for cooling the incoming ambient air as it passes through those openings into the air treatment compartment 28. Since the mechanisms mounted adjacent each of the main air inlet openings 21, 22 and 23 are identical, the following detailed description of the mechanisms associated with the inlet 22 will be understood to also apply to the mechanisms associated with the other main air inlet openings 21 and 23.

As seen in FIG. 2, a suitable louver plate 44 is demountably carried on the exterior of the cabinet 12, such as by means of the illustrated snap fasteners 45, so as to overlay the main air inlet opening 22. The main air inlet opening 22 is defined by an endless recessed flange 46 to which a flange 47 mounted so as to surround the air inlet face of a heat exchanger unit 48 is suitably attached. The heat exchanger unit 48 is mounted so that ambient air entering through the inlet opening 22 will pass through the heat exchanger unit 48 for lowering the temperature of the air as will hereinafter be described. An endless channel 50 is mounted, such as by welding, on the heat exchanger unit 48 so as to surround the air outlet face 52 thereof. An elongated ledge 54 is carried on the bottom leg of the endless channel 50. This elongated ledge 54 is used to supportingly carry a wettable fibrous pad 56 with the elongated ledge 54 and the endless channel 50, in conjunction with a partial wall 58 depending from the roof of the cabinet 12, defining an open framework which supportingly locates the wettable pad 56 so that air emerging from the heat exchanger unit 48 will pass through the wettable pad. The wettable pad 56 is of the type commonly used in evaporative coolers and includes a loosely packed fibrous material 60, usually excelsior, the edges of which are supported by a sheet metal frame 62 and wire mesh grills 64 are used to support the opposite planar surfaces of the fibrous material.

As is known in the art, the wettable pad 56 must be periodically removed for replacement of the fibrous material 60 which during use becomes contaminated with dirt and other foreign matter and will become impregnated with scale which forms as a result of the evaporation process which leaves mineral deposits behind. For this reason, the framework which supports the wettable pad 56 is open at the top and an elongated access opening having a removable cap 66 mounted therein, is formed through the roof 20 of the cabinet 12 so as to be in vertical alignment with the pad 56.

The top leg 68 of the sheet metal frame 62 which supports the fibrous material 60 of the pad 56 is configured in the form of a V-shaped in cross section trough having spaced slits 70 formed therein. This trough leg 68 receives water from a water distribution plumbing network, which will hereinafter be described, and distributes the water evenly accross the top of the fibrous material 60. The water trickles down through the pad 56 under the influence of gravity and such wetting of the pad will evaporatively cool the air passing therethrough. The unevaporated water passes through the apertures 72 formed in the bottom leg 74 of the sheet metal frame and falls into a first, or main sump 76 formed in the floor pan 14 of the cabinet 12. The sump 76 is a water reservoir and includes a pump 78 having a water delivery line 80 which is connected to a suitable fitting 82 mounted in the top of the cabinet 12, and the fitting distributes the pumped water through lines 84 to the top of each of the wettable pads 56 mounted in the main air inlet openings 21, 22 and 23.

Water from an external source (not shown) is supplied to the main sump 76 through a float controlled shutoff valve 86 of the well known type which is used to initially supply water to the sump and also supply makeup water thereto for replacing that lost by evaporation.

It will be noted that, with the exception of the heat exchangers 48, all of the mechanisms and devices thus far described and mounted in the air treatment chamber 28 are directly involved in the evaporative cooling of air.

As hereinbefore mentioned, the cabinet 12 is provided with the auxiliary air inlet opening 24, and that opening as seen best in FIG. 2 is defined by an endless recessed flange 90 formed in the side of the cabinet. A suitable louver plate 92 is demountably carried on the side of the cabinet so as to overlay the auxiliary air inlet opening 24. A water chiller 94 having an endless flange 96 surrounding its air inlet face, is mounted in the auxiliary air inlet opening 24 so that air moving into the water chilling compartment 30 of the cabinet 12 will pass through the water chiller 94.

The water chiller 94 has a water distribution manifold 98 extending across its top with a plurality of apertures 100 (one shown) formed in spaced increments therealong. Water suplied, in the manner to be hereinafter described, to the manifold 98 is distributed evenly across the top of the water chiller 94, and will flow downwardly under the influence of gravity through a vertically aligned staggered array of spaced deflector plates 102 and will fall from the lowermost plate into a second, or auxiliary sump 104 formed in the floor pan 14 of the cabinet 12. The water chiller 94 operates in the manner of a cooling tower and thus, both the air and the water moving through the chiller will be cooled by evaporation.

Air is moved into the water chilling compartment 30 by means of a second or auxiliary air handling device 106, which is illustrated in the form of a motor driven fan 108. The motor driven fan 108 is mounted on suitable brackets 110 so as to be axially positioned in a shroud duct 112 having an outlet 114 which is suitably connected to the auxiliary air outlet duct 14. It will be understoodd that the motor driven fan 108 is shown for illustrative purposes only in that this air moving function could also be accomplished by a suitable centrifugal blower.

As mentioned above, the air that is moved through the water chiller 94 is cooled by evaporation and the cooled air may be simply exhausted to ambient through the auxiliary air outlet duct 18 or may be supplied to a secondary point of use. By way of example, the cooled air may be directed into the attic space of a building to reduce the heat load on the occupied spaces below the attic.

The second or auxiliary sump 104, i.e. the one provided in the bottom of the water chilling compartment 30, is provided with a suitable pump 116 which supplies the chilled water under pressure through a line 118 to a tee 120. One branch of the tee 120 is coupled by a line 122 to the inlet 124 of the heat exchanger 48 mounted in the main air inlet opening 21. The other branch of the tee 120 is coupled by a line 126 to a second tee 128 which supplies the chilled water through lines 130 and 132 to the respective inlets 134 of the heat exchangers 48 mounted in the other main air inlet openings 22 and 23 of the cabinet.

The heat exchangers may be of any suitable well known configuration, and each are provided with the hereinbefore mentioned chilled water inlet and each have an outlet 136. The water outlets 136 of the heat exchangers 48 have return lines 138 connected thereto and these return lines pass through the divider partition 26 and are each connected to the distribution manifold 98 as shown at 140 to return the water to the chiller 94.

The chilled water will absorb heat from the ambient air which is moved through the heat exchangers 48 on its way to the evaporative cooler pads 56 and the water is returned to the water chiller 94 for rechilling and recirculation. The initial filling of the auxiliary sump 104 and supplying make-up water thereto is accomplished by a float controlled shutoff valve 142 which is connected to a suitable external source of water under pressure (not shown) such as a domestic water supply line.

It will now be appreciated that by subjecting the ambient air, which is drawn into the air treatment compartment 28, to two separate air cooling steps, that air will be cooled to lower temperatures than can be achieved by either one of the steps separately. It will be noted that the air cooling apparatus 10 is equipped with two separate air moving devices and water pumps. This allows separate use of the two air cooling systems as needed to provide adequate cooling at various climatic conditions. To explain, the water chilling mechanisms may be operated alone to supply cooled air to the secondary point of use only, the evaporative cooling mechanisms may be operated alone when that system alone is able to satisfy the required amount of cooling or the two systems may be simultaneously operated.

Reference is now made to FIG. 4 wherein a second embodiment of the air cooling apparatus of the present invention is shown, with this apparatus being identified in its entirety by the reference numeral 150.

The air cooling apparatus 150 includes a conventional evaporative cooler structure 152 of the well known commonly used type. Since this cooler 152 is well known, only a brief discussion thereof will be made herein. The evaporative cooler shown is what is commonly referred to in the art as a downdraft model due to its air delivery outlet opening (not shown) being located in the floor pan 153 thereof. Such location of the air outlet opening allows a wettable fibrous cooler pad (not shown) to be mounted in each of the sides 154, 155, 156 and 157 of its cabinet 158. The cooler pads, air moving device, and its water distribution system are all mounted within the cabinet 158 and are similar in both design and operation to the evaporative cooler mechanisms herein before described as being located in the air handling compartment 28 of the air cooling device 10.

To equip the evaporative cooler 152 so that it can operate in accordance with the stated objectives of the present invention, a pair of brackets 160 are affixed, such as by welding, to opposed corners of the roof 162 of the cooler cabinet 158 and extend oppositely therefrom. An identical pair of brackets 164 are affixed to the floor pan 158 of the cooler and are each in vertical alignment with a different one of the brackets 160. The roof 162 also has a pair of plates 166 affixed to its other two corners so as to extend oppositely from the cabinet, and an identical vertically aligned pair of plates 168 (one shown) extend oppositely from the floor pan 153 thereof.

Heat exchangers 170, 171, 172 and 173 are provided for each side 154, 155, 156 and 157 of the evaporative cooler cabinet 158 and each of the four heat exchangers are identically configured and mounted. Therefore, the following description of the heat exchanger 170 which is mounted so as to overlay the side 154 of the cabinet will be understood to also apply to the other heat exchangers 171, 172 and 173.

The heat exchanger 170 is of conventional configuration having a chilled water inlet 174 and a water outlet 176. An elongated strap 178 is mounted, such as by welding, to extend along the top edge of the heat exchanger body and extend oppositely beyond the side edges thereof to form extending tabs 180 and 182. The extending tab 182 is attached to the bracket 160 by means of a pivot pin 184 and the other extending tab 180 is provided with an upstanding pin 186 as will hereinafter be described. A similar elongated strap 188 is affixed so as to extend along the bottom edge of the heat exchanger body and provide similar extending tabs 190 and 192. The extending tab 192 is attached to the bracket 164 by a pivot pin 194 and the other extending tab 190 is provided with a depending pin 196.

In this manner the heat exchangers 170-173 are pivotably mounted on their respective sides of the cooler cabinet 158 and when they are positioned to overlay their respective sides as shown by the positions of the heat exchangers 171 and 172, they will be held in the overlaying position by means of the upstanding pins 186 which are in arcuate slots 198 formed in the top plates 166, and the depending pins 196 which are in similar slots 200 formed in the bottom plates 168. When it becomes necessary to replace the cooler pads (not shown) or otherwise service the evaporative cooler 152, the heat exchangers 170-173 may be pivotably swung out of the way in the manner indicated by the illustrated positions of the heat exchangers 170 and 173.

Chilled water is supplied to the heat exchangers 170-173 from a water chilling means 202 which is separate from the evaporative cooler 152. The water chilling means may be of any suitable configuration which is shown as simply including an open top pan 204 which serves as a water reservoir. A pump 206 is mounted in the pan and supplies chilled water under pressure to a suitable cross fitting 208 which directs the water through the lines 210 to the inlets 174 of the heat exchangers 170-173. Water emerging from the outlets 176 of the heat exchangers 170-173 is collected in return lines 212 and delivered back to a spray tower structure means 214 which forms part of the water chilling means 202. The spray tower means 214 may include a suitable standard 216 positioned to extend above the open top pan 204 to support at least a pair of spray arm conduits 218 having suitable apertures formed in spaced increments therealong. The water returning from the heat exchanger 170-173 is delivered to the spray arms 218 as shown at 220 and will fall therefrom through the air into the pan 204 and will thus be chilled by evaporation.

Both the initial and make-up water may be supplied to the reservoir pan 204 in the hereinbefore described manner by means of a suitable float controlled shutoff valve 222.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles.

For example, although the main sump 76 and auxiliary sump 104 are shown and described as being separated from each other, the same objective could be accomplished by a common sump (not shown) which is formed by terminating the divider partition 26 immediately below the water level.

The appended claims are therefore intended to cover and embrace any such modifications within the limits only of the true spirit and scope of the invention.

What I claim is:

1. An air cooling apparatus comprising in combination:
   (a) an evaporative cooler including a cabinet having at least one air inlet opening with a wettable fibrous pad mounted in said opening and having means for passing water through said pad, said cabinet including an air handler therein for drawing ambient air into said cabinet through said opening and said pad;
   (b) a heat exchanger mounted in front of the wettable fibrous pad of said evaporative cooler in overlaying relationship so that the ambient air will pass through said heat exchanger prior to passing through said wettable fibrous pad; and
   (c) means separate from said evaporative cooler for chilling water by evaporation and recirculatingly passing the chilled water through said heat exchanger means.

2. An air cooling apparatus as claimed in claim 1 wherein said means for chilling water is located externally of the cabinet of said evaporative cooler and is coupled to said heat exchanger.

3. An air cooling apparatus as claimed in claim 1 wherein said heat exchanger is mounted on the exterior of the cabinet of said evaporative cooler in overlaying relationship with the air inlet opening thereof and is pivotably movable to provide access to the wettable fibrous pad mounted in the air inlet opening of the cabinet.

4. An air cooling apparatus as claimed in claim 1 wherein said means for chilling water comprises:
   (a) an upwardly opening water reservoir;
   (b) a pump for supplying water from said water reservoir to said heat exchanger; and
   (c) a spray manifold coupled to receive water from said heat exchanger, said spray manifold positioned above said water reservoir so that the water received by said spray manifold will fall through the air into said water reservoir.

5. An air cooling apparatus as claimed in claim 1 wherein said means for chilling water is located within the cabinet of said evaporative cooler.

6. An air cooling apparatus as claimed in claim 1 wherein said means for chilling water is located in the cabinet of said evaporative cooler and comprises:
   (a) an auxiliary air inlet opening formed in the cabinet of said evaporative cooler;
   (b) a water chiller means mounted within the cabinet of said evaporative cooler adjacent the auxiliary air inlet opening thereof;
   (c) an auxiliary air handler means mounted in the cabinet of said evaporative cooler for drawing ambient air into the interior thereof through said water chiller means;
   (d) a sump formed in the bottom of the cabinet of said evaporative cooler below said water chiller means for receiving chilled water therefrom; and
   (e) a pump located in said sump for passing the chilled water through said heat exchanger back to said water chiller means.

7. An air cooling apparatus as claimed in claim 6 and further comprising a partition in the cabinet of said evaporative cooler to provide a separate water chilling compartment therein which contains said water chiller means, said auxiliary air handler, said sump and said pump.

8. An air cooling apparatus comprising:
   (a) a cabinet having an air treatment compartment and a water chilling compartment therein, said cabinet having at least one main air inlet opening and a main air outlet opening by which air is movable through the air treatment compartment of said cabinet and having an auxiliary air inlet opening and an auxiliary air outlet opening by which air is movable through the water chilling compartment of said cabinet;
   (b) a main air handler mounted in the air treatment compartment of said cabinet for moving air therethrough;
   (c) an auxiliary air handler mounted in the water chilling compartment of said cabinet for moving air therethrough;
   (d) water chiller means mounted in the auxiliary air inlet opening of said cabinet for chilling water by evaporation when air is moved through the water chilling compartment of said cabinet;
   (e) a heat exchanger mounted in the main air inlet opening of said cabinet;
   (f) means coupled between said water chiller means and said heat exchanger for recirculatingly passing water through said water chiller means and said heat exchanger means;
   (g) a wettable fibrous pad mounted in the main air inlet opening of said cabinet adjacent said heat exchanger and downstream thereof so that air movable through the air treatment compartment of said cabinet will move through said heat exchanger and then through said wettable fibrous pad; and
   (h) means for passing water through said pad.

9. An air cooling apparatus as claimed in claim 8 and further comprising;
   (a) said cabinet having a main sump in the air treatment compartment thereof; and
   (b) pump means for recirculatingly passing water from said main sump through said wettable fibrous pad and back to said main sump for wetting of said wettable fibrous pad.

10. An air cooling apparatus as claimed in claim 9 and further comprising means for supplying water to said main sump and maintain it at a predetermined level therein.

11. An air cooling apparatus as claimed in claim 8 wherein said water chilling means comprises:
   (a) a vertically aligned staggered array of deflector plates; and
   (b) a water distribution manifold above said array of deflector plates and coupled to receive water from said heat exchanger, said distribution manifold having apertures for distributing the received water evenly across the top of said array of deflector plates thereover so that the water will flow downwardly thereover.

12. An air cooling apparatus as claimed in claim 8 wherein said means coupled between said water chiller means and said heat exchanger comprises:
   (a) said cabinet having an auxiliary sump in the water chilling compartment thereof for receiving water from said water chiller means; and
   (b) means in said auxiliary sump for recirculatingly passing the water in said auxiliary sump through said heat exchanger and back to said water chiller means.

13. An air cooling apparatus as claimed in claim 12 and further comprising means for supplying water to said auxiliary sump and maintaining it at a predetermined level therein.

* * * * *